3,424,911
PHOTOELECTRIC WEB REGISTER CONTROL
William D. Cockrell, Waynesboro, Va., assignor to General Electric Company, a corporation of New York
Filed May 5, 1965, Ser. No. 453,368
U.S. Cl. 250—219      11 Claims
Int. Cl. G01n 21/30

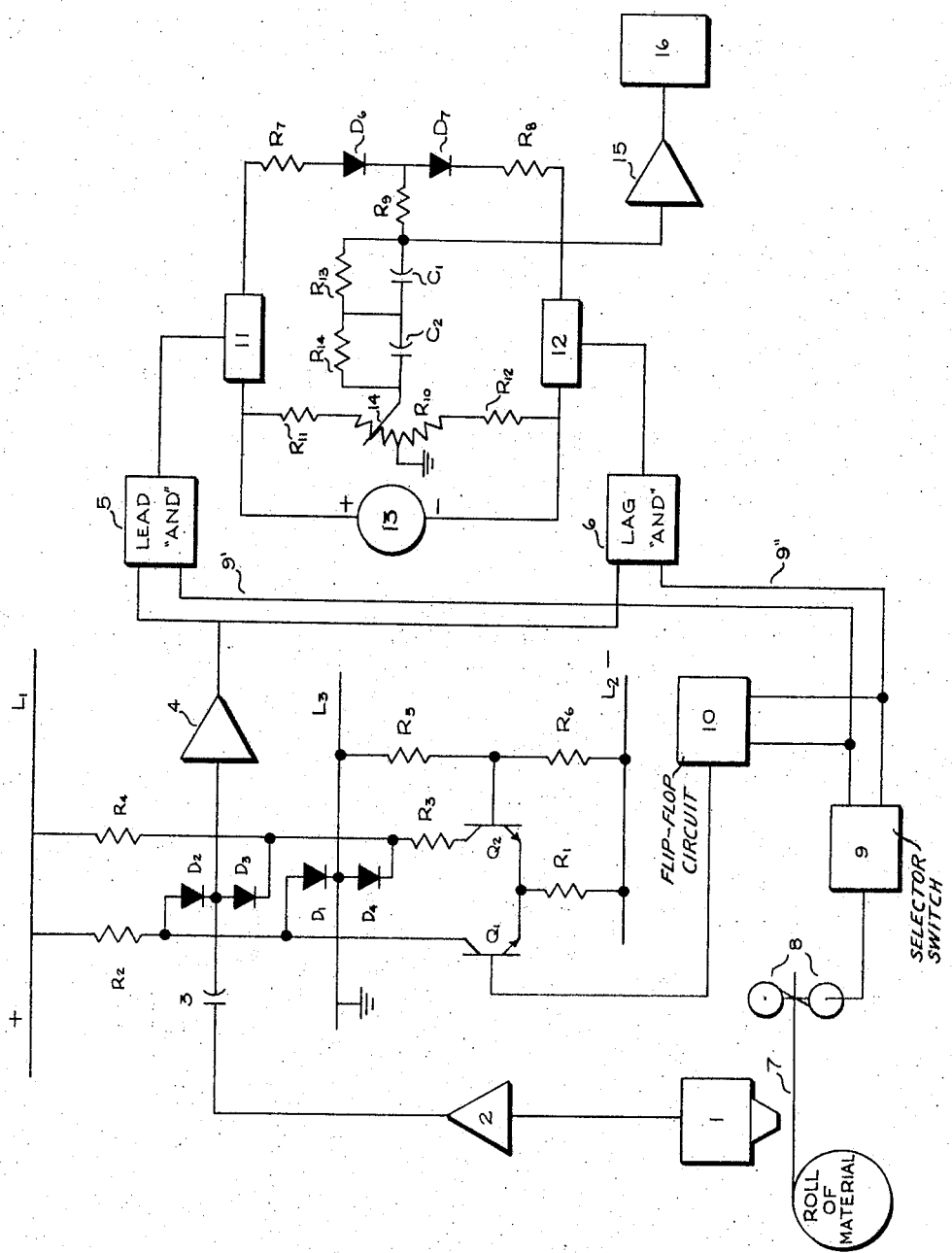
INVENTOR.
WILLIAM D. COCKRELL
BY W. J. Shanley Jr.
HIS ATTORNEY

# United States Patent Office 3,424,911
Patented Jan. 28, 1969

ABSTRACT OF THE DISCLOSURE

A voltage clamp for a register control system wherein a sensor output is maintained at a reference potential except when it is desired to have the sensor output effective to control the system. A flip-flop multi-vibrator circuit alternately biases a first transistor of a pair of transistors into conduction, the conductive state of the pair of transistors controlling the application of the reference potential to the sensor output.

---

The present invention relates to register control systems and more specifically to register control systems wherein it is desired to maintain a predetermined relationship between a length of moving material and an element operating thereon.

The present invention relates to an improvement over U.S. Patent 2,250,209 which is also assigned to the assignee of the present invention and which is hereby incorporated by reference as a part of the present invention.

Generally, in existing register control systems a sensor, such as a photoelectric head, is used for scanning a length of moving material passing thereunder and in response to register marks spaced at predetermined intervals on the material equal to the length of material to be operated upon, a first electrical signal is generated. At the same time, an element may be operating on the material as it is moving through the system. Generally, this operating element comprises a rotatable cutting head used for severing predetermined lengths from the moving material. During a time period immediately preceding the actual cutting of the material and a time period immediately subsequent thereto, second and third electrical signals are generated by means responsive to the position of the cutting head; however, no signal occurs during the actual time of cutting and a "dead zone" exists. If a proper relationship exists between the cutting head and the moving material, the signal from the photoelectric scanner occurs during the "dead zone" and there is no overlap between the photoelectric scanner and cutting head signals. If, however, the length of material is moving out of phase with the cutting head such that the cutting head is operating sooner or later than desired, there exists a signal overlap between the photoelectric scanner signal and one of the cutting head signals. When this overlap occurs, energy from a constant energy source is supplied to a means which in response thereto corrects the error.

However, the photoelectric scanner is at all times free to detect any marks on the moving material. This may result in false marks being detected and the generation of signals which could cause malfunction of the system. It is therefore desirable to have the photoelectric scanner output clamped to a reference potential and free to detect register marks only during short time intervals adjacent the time when the cutting takes place.

Further, it is also desirable to have a correction signal which is proportional to the speed of the moving material since for faster speeds of the material, the length in time of the signal overlap is decreased and hence the correction response is less.

Therefore, one object of the present invention is to provide a voltage clamp for a register control system wherein the clamp maintains a sensor output at a reference potential except when it is desired to have the sensor output effective to control the system.

Another object of the present invention is to provide a register control system for maintaining the relative positions between a length of moving material and an element operating thereon constant whereby a correction signal is generated having a value proportional to the degree of the error in the system so that for given errors in the system, the correction signal is a constant value.

Another object of the present invention is to provide a register control system wherein the relative correction between a length of moving material and an element operating thereon is maintained constant by means proportional to the speed of the moving material.

Briefly, the present invention includes an energy storage device and means having a voltage proportional to the speed of the moving material associated therewith. When there is an error in the relationship between the length of the moving material and the element operating thereon, the voltage means is connected to the energy storage device and is effective to vary the amount of energy therein. In response to such energy change, means are provided for correcting the error.

Further, means are also provided for connecting a sensor output to the reference potential where the sensor is disconnected from the reference potential only at predetermined time intervals. Semiconductor devices having two conducting states are in a circuit with the sensor output. When it is desired to disconnect the sensor output from the reference potential, means are provided for reversing the conducting states of the semiconductor devices. In this manner, the relative position between the length of moving material and an element operating thereon is maintained constant.

Additional objects and advantages of the present invention together with a better understanding thereof may be had by referring to the following detailed description of a preferred embodiment of the present invention along with the accompanying drawing.

The figure shown is a schematic diagram of an embodiment of the present invention.

Referring now to the figure, an embodiment of the present invention includes a sensor 1, which in this instance comprises a photoelectric scanner, the specific construction of which forms no part of the present invention, whose output is connected through an amplifier 2 to an output capacitor 3. In order to avoid transmitting spurious signals due to the detecting of false marks, it is desired to clamp the capacitor 3 to a reference potential during certain periods of operation.

The control means for connecting the sensor output to a reference potential L3 includes first Q1 and second Q2 semiconductor means each having two conductive states. Specifically, a pair of NPN transistors Q1 and Q2 are used each having its respective emitter connected through a common emitter resistor R1 to a source of negative potential L2. The collector of the first transistor Q1 is connected through a dropping resistor R2 to a source of positive potential L1. The collector of the second transistor Q2 is connected through a pair of dropping resistors R3 and R4 to the source of positive potential L1. The base of the second transistor Q2 is connected to the junction between two bias resistors R5 and R6. One of the bias resistors R5 is connected to the reference potential L3 while the other of the bias resistors R6 is connected to the source of negative potential L2. The base of the first transistor Q1 is connected to means for alternately biasing the first transistor Q1 into conduction.

The alternately biasing means, the specific construction of which forms no part of the present invention, comprises a flip flop multivibrator circuit 10 whose output is connected to the base of the first transistor Q1 so that the base is made either positive or negative with respect to its emitter.

A first diode D1 has its anode connected to the collector of the first transistor Q1 and its cathode connected to the reference potential L3. A second diode D2 also has its anode connected to the collector of the first transistor Q1; however, its cathode is connected to a terminal of the output capacitor 3. A third diode D3 has its cathode connected to the junction of the dropping resistors R3 and R4 in the collector circuit of the second transistor Q2 and its anode connected to a terminal of the output capacitor 3. A fourth diode D4 also has its cathode connected to the junction of the two dropping resistors R3 and R4 in the collector circuit of the second transistor Q2; however, its anode is connected to the reference potential L3.

Referring now to the remainder of the circuit as shown in FIG. 1, there is shown a length of moving material 7 which passes under a cutting head 8 wherein predetermined lengths of the material are severed. Connected to the cutting head 8 is a selector switch 9, the specific construction of which forms no part of the present invention as such switches are well-known and commonly used in the art. The selector switch 9, in this instance comprises a photoelectric switch for generating two electrical signals. A first signal, or lead signal, is generated during the time interval just prior to the severing of the material by the cutting head 8. A second signal, or lag signal, is generated during the time interval immediately subsequent to the severing of the material by the cutting head 8. It should be noted that each of the signals exists for only a portion of a mechanical revolution of the rotatable cutting head as for instance approximately 20°. No signal is generated during the remainder of the rotation of the cutting head 8. Further, as the lead signal terminates prior to the actual severing of the material by the cutting head 8 and the lag signal is generated subsequent to the actual severing of the material, no signal exists during the actual cutting interval when the cutting head is in register with the material.

The lead signal is supplied to the means for causing conduction of the transistors Q1 and Q2; in this instance, by setting the flip-flop circuit 10. Upon generation of the lead signal, the flip-flop circuit 10 produces a positive output signal which is supplied to the base of the first transistor Q1. As the base of the transistor Q1 is made positive with respect to its emitter, Q1 is rendered conducting and, as will be described in detail hereinafter, Q2 is rendered nonconducting and the output capacitor 3 is disconnected from the reference potential L3.

A similar lag signal maintains the flip-flop circuit 10 so that a positive output signal continues and the base of the first transistor Q1 is kept positive with respect to its emitter. Upon the termination of the lag signal the flip-flop is reset. As the base of the first transistor Q1 is made negative with respect to its emitter, the transistor is biased into nonconduction and transistor Q2 becomes conductive whereby the output capacitor is again connected to the potential reference.

During the remainder of the rotation of the cutting head 8, the output capacitor 3 is connected to the potential reference and remains so until the cutting head 8 reaches a position wherein a lead signal is produced which causes the output capacitor 3 to again be disconnected from the potential reference L3.

The lead signal is also supplied through conductor 9' to one of two input electrodes on a first "and" gate 5. The lag signal is similarly connected through conductor 9" to one of the two input electrodes on a second "and" gate 6. The output capacitor 3 is connected through an amplifier 4 to the other of the input electrodes on each of the two "and" gates. For purposes of this discussion, the "and" gate to which the lead signal is connected will hereinafter be referred to as the lead "and" gate, and the "and" gate to which the lag signal is connected will be referred to as the lag "and" gate.

As each of the "and" gates 5 and 6 are responsive to the simultaneous occurrence of two signals, and as two signals will occur simultaneously on either of the "and" gates 5 or 6 only when there is an error in the relationship between the length of material 7 and cutting head 8, a signal from the "and" gates can be used to control a switching means to effect correction of an error in the system. Specifically, the lead "and" gate 5 is connected to the control element of a first controlled switch 11 and the positive side of the output of a DC tachometer generator 13, whose output is proportional to the speed of the moving material 7, is connected to one side of the controlled switch 11. Similarly, the lag "and" gate 6 output is connected to the control element of a second controlled switch 12, to one side of which the negative side of the DC tachometer generator 13 is connected. The other side of the first controlled switch 11 is connected through a first load resistor R7, series connected diodes D6 and D7, and a second load resistor R8 to the other side of the second controlled switch 12. Connected to the junction of the series connected diodes D6 and D7 is a resistor R9, series capacitors C1 and C2, and the slide wire 14 of a variable resistor R10. The variable resistor R10 is connected between a pair of series connected resistors R11 and R12 whose opposite ends are connected respectively across the output of the DC tachometer generator 13. Across the first capacitor C1 is connected a resistor R13 having a relatively low value resistance. The second capacitor C2 has a relatively large value resistor R14 connected thereacross. Ideally, the slide wire 14 of the variable resistor R10 is maintained at a zero potential, that of the reference potential; however, it may be kept at any potential which is required to maintain correct operation of the cutting head drive mechanism, which is not shown. Thus, the capacitors C1 and C2 ideally will be uncharged; however, it may be necessary to maintain a given charge therein as discussed above.

It can be seen that when the first controlled switch 11 is closed by a signal from the lead "and" gate 5, the positive side of the DC tachometer generator 13 will be connected through the load resistor R7 and diode D6 to the capacitors C1 and C2 so as to vary the charge thereon. Similarly, when the second controlled switch 12 is closed, the negative side of the DC tachometer generator 13 is connected to the capacitors C1 and C2 through load resistor R8 and diode D7 to the capacitors C1 and C2 to vary the charge thereon. As will be discussed later on, by varying this charge, correction of an error can be obtained.

The first capacitor C1, due to its being of relative low capacitance and being shunted by a resistor of relatively low resistance R13, has a relatively short time constant. This results in a rapid charging and decay of the charge on the capacitor wherein a fast acting correction signal is supplied for short periods of time. Any charge on the capacitor C1 is used for correcting space errors in the system which exist when there is a momentary slippage of the web or other momentary change in the system.

The second capacitor C2, by being of relatively large size and being shunted by a resistor R14 of a relatively high resistance, has a relatively long time constant. This results in a slower charging rate thereof; however, a longer period of correction exists as the capacitor requires a longer period of time for discharge thereof. The charge on capacitor C2 is used for correction of any velocity errors in the system which exist when there if a continuous error in the velocity of the web.

Under ideal circumstances, there is no charge on either of the capacitors C1 or C2; however, as previously mentioned in order to obtain the desired relationship between the moving material and the operating element, it might be necessary to adjust the slide wire 10 on the variable resistance 14 to a value either above or below the zero reference potential L3 wherein an initial charge will be present on the capacitors. Resistors R10, R11, and R12 provide for fine adjustment of the initial charge on the capacitors C1 and C2.

The junction between the first capacitor C1 and resistor R9 is connected through an amplifier 15 to a means 16 for controlling the relationship between the length of moving material and the operating element. Specifically, as is shown in U.S. Patent 2,250,209, this means may comprise a correcting motor whose field circuit is responsive to any change in the charge on the capacitors C1 or C2 to either speed up or slow down the moving material so that the predetermined relationship is regained.

Turning now to the operation of the clamping circuit of the present invention, assume that the base of transistor Q1 is negative with respect to its emitter so that transistor Q1 is nonconducting. This occurs during the time interval from the termination of the lag signal to the beginning of the lead signal and is the result of the flip-flop circuit 10, in response to the termination of the lag signal, applying a negative potential to the base of transistor Q1. With transistor Q1 nonconducting, the base of transistor Q2 is positive with respect to its emitter and therefore transistor Q2 will be biased into conduction. The voltage on the emitter of transistor Q2, when transistor Q1 becomes nonconducting, approaches that of the negative supply whereas the voltage on the base of transistor Q2 is proportional to the ratio of the bias resistors R5 and R6. It can be seen that when Q1 is rendered nonconducting, Q2 will become conducting. Under these conditions, the collector of transistor Q1 rises toward a potential approximately equal to the source of the positive poential L1; however, due to this positive voltage, the anode of diode D1 is made positive with respect to its cathode and therefore D1 is conducting to the zero reference potential L3. Further, this same potential is supplied to the anode of diode D2 and it too becomes conducting due to the positive voltage on its anode as the anode of diode D2 rises above the potential of the output capacitor C3. It is noted that the forward drop into these diodes D1 and D2 is above the zero potential reference L3.

Simultaneously, diode D4 also becomes conducting as a result of the conduction of transistor Q2 causing the voltage of the junction between the bias resistors R3 and R4 to become less than the zero potential reference L3 and therefore the cathode of diode D4 is at a voltage level less than its anode. Similarly, diode D3 becomes conducting as its cathode also becomes negative with respect to its anode. Consequently, a second path from the output capacitor 3 to the zero potential reference L3 is created through diodes D3 and D4. Note, however, that the forward drops in the conducting diodes D3 and D4 are below the zero potential reference L3 so that the output capacitor is connected to the zero potential reference through a first diode path in which the forward drops of the conducting diodes are above the zero potential reference and a second diode path wherein the forward drops of the connecting diodes are below the zero potential reference L3.

Note that when diodes D1, D2, D3, and D4 are conducting the curent flowing therein is of a greater value than any current from the amplifier 2 to the output capacitor 3 so that the output capacitor remains "clamped" to the zero potential reference L3 when the diodes are conducting. Further, by connecting the output capacitor 3 to the zero potential reference L3 through diode paths one of which has a forward drop above the zero reference L3 and the other of which has a forward drop below that of the zero reference L3, temperature compensation is achieved whereby the output capacitor C3 is held close to the zero potential reference L3 is spite of any change in an ambient temperature condition.

When it is desired to free the output capacitor 3 from the zero potential reference L3, as when it is desired to couple the output signals of the sensor 1 to the "and" gates 5 and 6 in order to determine if a correct relationship between the moving material 7 and cutting head 8 exists, a positive signal from the flip-flop circuit 10 is applied to the base of the first transistor Q1. This positive signal is caused by the application of the lead signal from the selector switch 9 to the flip-flop circuit 10. When this occurs, transistor Q1 is immediately biased into conduction and the collector voltage drops to a value which is below that of the zero potential reference. When this occurs, the second transistor Q2 is driven to a nonconducting state whereby the voltage at the junction between the two bias resistors R4 and R3 in the collector circuit rises to a level approaching that of the source voltage. With these new voltages on the collectors of the transistors, the diodes are now reverse biased so that they are now in a nonconducting state. When the diodes are in a nonconducting state, there no longer is a path from the output capacitor 3 to the zero potential reference and the output of the capacitor 3 is free to follow any signal generated by the sensor. With the output capacitor 3 disconnected from the zero potential reference, the capacitor is able to supply sensed signals through the amplifier 4 to the control for the web register.

When it is again desired to connect the output capacitor 3 to the zero potential reference L3, as it is during the time period from the termination of the lag signal to the beginning of the lead signal so as to prevent the system from being responsive to false register marks, a negative pulse from the flip-flop circuit 10 is applied to the base of the first transistor Q1 which negative pulse is effective to bias the transistor Q1 to a nonconducting state. The biasing of Q1 to a nonconducting state causes the biasing of transistor Q2 into conduction as previously discussed and upon this occurrence, the output capacitor 3 is again connected to the zero potential reference L3 to the parallel diode paths.

Turning now to the operation of another aspect of the present invention, as was previously mentioned the output capacitor 3 is connected through the amplifier 4 to an input on both the lead "and" gate 5 and the lag "and" gate 6. When a lead signal is generated from the selector switch 9, this signal also appears on the input conductor 9' of the lead "and" gate 5. If the predetermined relationship between the length of moving material 7 and the operating element 8 exists, the lead signal on the lead "and" gate 5 will terminate prior to the arrival of a signal from the sensor 1 so that there will be no overlap of the signals. Similarly, the lag signal, the termination of which is used to again connect the output capacitor 3, will occur after the signal from the sensor 1 has terminated and be supplied by the conductor 9" to the lag "and" gate 6. Therefore, neither control switch 11 or 12 will be closed and the DC tachometer generator 13 will not be effective to vary the charge on the capacitors C1 and C2 and control the register system.

However, should the cutting head 8 be operating too soon so that the predetermined relationship between the length of material 7 and cutting head 8 is not maintained, the signals from the selector switch 9 and the output capacitor 3 will arrive at the lead "and" gate 5 simultaneously and thus an output signal will be applied to the controlled switch 11. If the controlled switch 11 is closed, the positive voltage from the DC tachometer generator will be applied to the capacitors C1 and C2 through R7 and the diode D6. This voltage is effective to increase the charge on the capacitors which charge increase is effective to cause an increased current flow through the correction motor windings and cause the correction motor to operate so as to increase the speed of the length of moving material.

Similarly, if the cutting head is cutting too late, that is when the length of material is moving faster than the cutting head, there is an overlap of the sensor signal and the lag signal which results in the simultaneous occurrence of both signals on the input of the lag "and" gate 6.

This in turn causes the closing of the controlled switch 12 upon the closing of which the negative voltage from the DC tachometer generator 13 is applied to the capacitors C1 and C2 so as to decrease the charge thereon.

As the output voltage of the DC tachometer generator 13 is proportional to the speed of the moving material, when the DC tachometer generator 13 is connected to the capacitors C1 and C2 either through controlled switch 11 or controlled switch 12, any varying of the charge on the capacitors will be proportional to the voltage applied thereto and as this voltage is proportional to the speed of the moving material 7, the correction signal will be proportional to the speed of the moving material. However, the time period in which two signals overlap at either of the "and" gates, and consequently the time period during which either of the respective controlled switches are closed, for a given error is shorter at higher speeds of the moving web:

$$t = L/V$$

where

L = a given error
V = velocity of the moving material

If the DC tachometer generator output is equal to KV, where K is a system constant, then the change in the charge on the space error capacitor C1 is equal to KVt. Since the DC tachometer voltage is proportional to $t$, the charge change on the capacitor C1 will be equal to $KV \times L/V$ or KL. Thus it can be shown that for a given space error L, the amount of correction will be a constant value (KL) for all speeds of the moving web. This same charge is "leaked" to the velocity error capacitor C2 to provide a velocity change to compensate for the cause which permitted the error to occur.

With this system, it can be seen that the present invention is useful for clamping a circuit on both polarities with a fast acting low impedance clamp, which when released, provides extremely high impedance to any signal on the line. Further, the present invention also provides a correcting signal which is the same for all speeds of the moving material.

While I have shown and described a particular embodiment of the present invention, it will be obvious to those skilled in the art that various changes and modifications may be made without departing from the present invention in its broader aspect and therefore it is the intention of the appended claims to cover all such changes and modifications as fall within the true spirit and scope of the present invention.

What I claim as new and desire to secure by Letters Patent of the United States is:

1. A voltage clamp for maintaining a sensor output at a reference potential including first semiconductor means having two conductive states for connecting the sensor output to the reference potential, second semiconductor means having two conductive states connected to said first semiconductor means, and means for alternately biasing said second semiconductor means from one conductive state to another to alternately cause said first semiconductor means to become conducting, said sensor output being connected to the reference potential when said first semiconductor means are conducting.

2. A voltage clamp as described in claim 1 wherein said first semiconductor means include diode means.

3. A voltage clamp for maintaining a sensor output at a reference potential including:
   (a) first and second diode means for connecting the output of a sensor to a reference potential,
   (b) a first transistor in a circuit with said first diode means for controlling the conduction state thereof,
   (c) a second transistor in a circuit with said second diode means for controlling the conduction state thereof, and
   (d) means for alternately switching the conduction states of said transistors to cause said diode means to be alternately conducting and nonconducting whereby the output of the sensor is connected to the reference potential when said diode means are conducting.

4. A voltage clamp for maintaining a sensor output at a reference potential including:
   (a) first diode means for connecting the output of the sensor to a reference potential, said first diode means having a forward drop above the reference potential,
   (b) second diode means for connecting the output of the sensor to a reference potential, said second diode means having a forward drop below the reference potential,
   (c) first and second transistors in a circuit with said diode means for controlling the conduction state thereof, and
   (d) a flip-flop circuit connected to said first transistor for alternately biasing said transistors into conduction, said diode means being conductive when said second transistor is conducting whereby the sensor output is connected to the reference potential when said diode means are conductive.

5. Means for clamping a sensor output to a reference potential including:
   (a) a first transistor,
   (b) a second transistor,
   (c) means to connect the collector of said first transistor to a positive bias voltage,
   (d) means to connect the collector of said second transistor to the positive bias voltage,
   (e) a common resistor means connecting the emitters of both of said transistors to a negative bias voltage,
   (f) a first diode connected between the sensor output and the collector of said first transistor,
   (g) a second diode connected between the collector of said first transistor and the reference potential,
   (h) a third diode connected between the collector of said second transistor and the sensor output,
   (i) a fourth diode connected between the collector of said second transistor and the reference potential, and
   (j) a flip-flop circuit for alternately biasing said first and second transistors into conduction, said diodes being conductive upon said second transistor being driven into conduction whereby the sensor output is connected to the reference potential.

6. A register control system for apparatus having an element operating on a length of moving material comprising:
   (a) an energy storage device,
   (b) means proportional to the speed of the moving material for varying the amount of energy in said energy storage device,
   (c) means responsive to the relative positions of the operating element and the length of material for connecting said proportional means to said energy storage device for increasing the energy in said energy storage device when an error in one direction in the relative positions of the element and the length of material occurs and for decreasing the energy in said energy storage device when an error in the opposite direction in the relative positions of the element and the length of material occurs, and
   (d) means responsive to the energy in said energy storage device for correcting any error in the relative positions of the operating element and the length of material.

7. A register control system as described in claim 6 wherein said proportional means includes a DC tachometer generator.

8. A register control system for apparatus having an element operating on a length of material comprising:
   (a) means for generating first electrical signals in response to a predetermined position of the material,
   (b) means for generating second and third electrical signals in response to predetermined positions of the operating element, (c) a single direct current tachometer generator having its output voltage proportional to the speed of the moving material,
(d) an energy storage device,
(e) a first "and" gate conductive only when said first and second electrical signals occur simultaneously for connecting said direct current tachometer generator to said energy storage device for increasing the amount of energy therein,
(f) a second "and" gate conductive only when said first and third electrical signals occur simultaneously for connecting said direct current tachometer generator to said energy storage device for decreasing the amount of energy therein, and
(g) means responsive to the energy in said energy storage device for regulating the relative positions of the operating element and the length of moving material.

9. A register control system as described in claim 8 further including means for disconnecting said first mentioned means from a reference potential when said second and third electrical signals occur.

10. A register control system as described in claim 9 wherein said disconnecting means includes:
(a) first and second diode means,
(b) first and second transistors in a circuit with said diode means for controlling the conduction state thereof, and
(c) means for alternately biasing said first and second transistors into conduction, said diode means being nonconductive when said first transistor is conducting whereby said first signal generating means is disconnected from the reference potential when the diode means are nonconducting.

11. A register control system for apparatus having an element operating on a length of material comprising:
(a) means for generating first electrical signals in response to a predetermined position of the material,
(b) means for generating second and third electrical signals in response to predetermined positions of the operating element,
(c) an energy storage device,
(d) means proportional to the speed of the moving material for varying the amount of energy in said energy storage device,
(e) means responsive to the simultaneous occurrence of the first and second electrical signals for connecting said proportional means to said energy storage device for a time interval equal to the time interval of the simultaneous occurrence of the first and second electrical signals to vary the amount of energy in said energy storage device, and
(f) means responsive to the simultaneous occurrence of the first and third electrical signals for connecting said proportional means to said energy storage device for a time interval equal to the time interval of the simultaneous occurrence of the first and third electrical signals to vary the amount of energy in said storage device and
(g) means responsive to the energy in said energy storage device for regulating the relative positions of the operating element and the length of moving material.

References Cited

UNITED STATES PATENTS 3,029,675  4/1962  Alexander et al. _____ 83—76
3,064,144  11/1962  Hardy _____ 307—88.5

ROBERT SEGAL, *Primary Examiner.*

R. F. HOSSFELD, *Assistant Examiner.*

U.S. Cl. X.R.

83—74; 307—237; 178—7.1